Oct. 15, 1968 T. DITTMER 3,405,515
FRUIT HARVESTER
Filed May 24, 1962
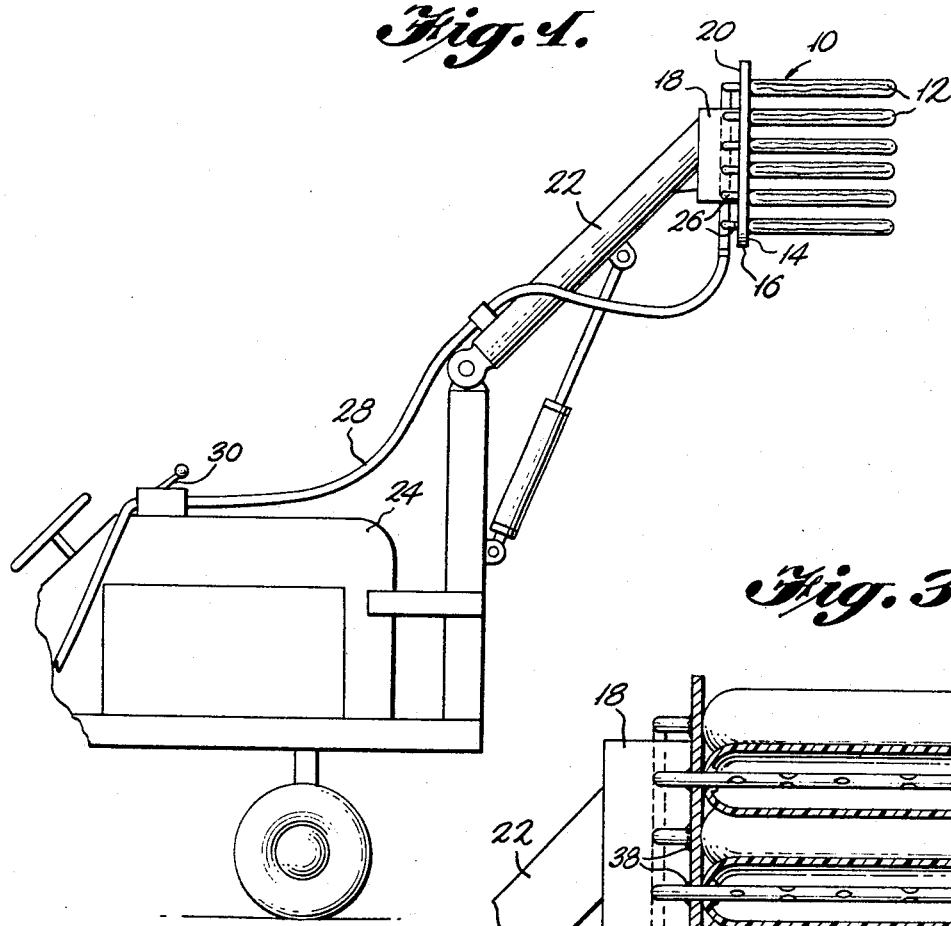
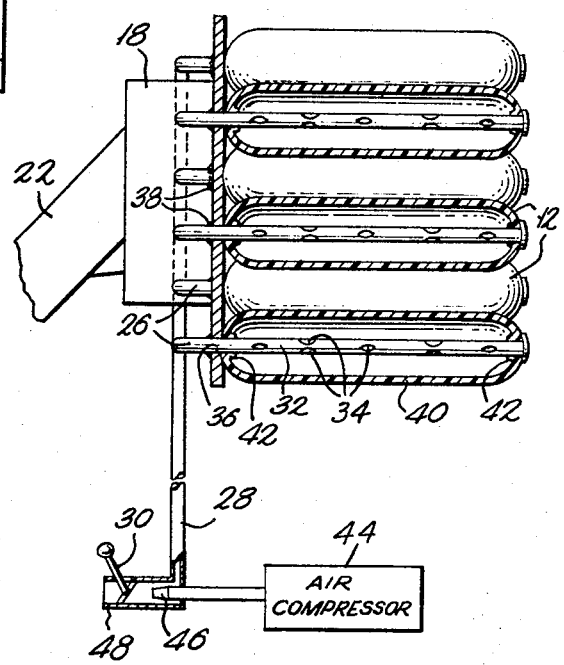
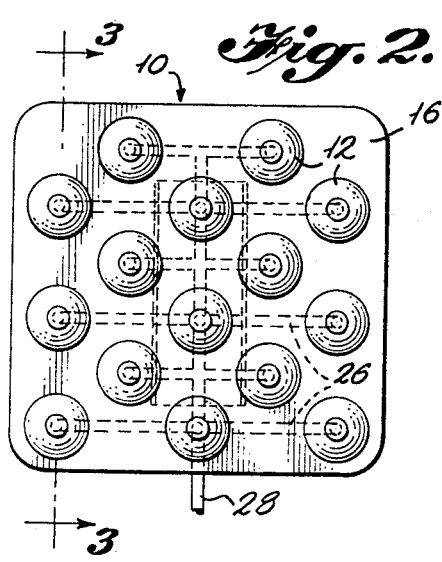

3,405,515
FRUIT HARVESTER
Theodore Dittmer, 817 Hayden Lane, Orlando, Fla. 32804
Filed May 24, 1962, Ser. No. 197,515
2 Claims. (Cl. 56—328)

This invention relates to fruit harvesters, and more particularly, it concerns a new and unique apparatus by which fruit may be picked from a tree and placed directly into a suitable container or vehicle. It is contemplated that the apparatus of this invention will have utility in the harvesting of all types of tree fruits but that it will find its principal application in the harvesting of citrus fruits, particularly oranges.

While fruit growers have benefited by the development of mechanized equipment, the problems with which they are confronted in harvesting their crops have gone substantially unsolved. The necessity for the fruit to be free of bruises and other defects caused by handling at the time it is marketed has rendered mechanical picking devices relatively ineffective as compared with hand picking and crating. Fruit growers, and particularly citrus fruit growers, continue to employ for the most part, therefore, a harvesting technique by which the fruit is manually removed from the trees by pickers standing on ladders or the like who place the picked fruit into "pickers' bags" and from there transfer the fruit to field crates prior to removal thereof from the grove. This procedure is not only time consuming and expensive, but also, the multiple handling of the fruit from the time it is picked from the tree until the time it reaches its ultimate point of use, often results in bruising and other damage.

A principal object of the present invention, therefore, is to provide a fruit harvesting apparatus by which many of the problems heretofore presented to fruit growers in picking their fruit from trees and removing it from the grove or orchard is substantially and effectively overcome.

Another object of this invention is to provide an apparatus of the type referred to by which fruit may be picked from a tree at an exceptionally high rate of speed while at the same time keeping damage to the fruit and to the tree at a minimum.

A further object of this invention is the provision of an apparatus of the type referred to which enables the picking of fruit from a tree and placement thereof directly into a truck or other suitable container by which it may be transported from the orchard or grove without damaging the fruit.

Still another object of this invention is to provide an apparatus for harvesting fruit which substantially eliminates the need for various ladders, field crates and other equipment together with all the expenses and problems associated therewith from the grove or orchard at the time of picking.

Other objects and further scope of applicability of the present invention will become apparent from the detailed description given hereinafter. It should be understood, however, that the detailed description, while indicating a preferred embodiment of the invention, is given by way of illustration only, since it will become apparent to those skilled in the art from this description, that various changes and modifications can be made without departing from the true spirit and scope of this invention.

In general, the aforementioned objects are accomplished by supporting on the end of a vehicle mounted boom assembly, a plurality of expansible probes extending in parallel with each other and spaced such that upon being contracted they may be introduced into the fruit bearing tree, the fruit taking a position between the probes whereby upon expansion thereof the fruit becomes engaged between the expanded probes. Thereafter, the probes are drawn outwardly of the tree while expanded, carrying the fruit with them for placement in a truck or other suitable container by again contracting the probes. Preferably, though not necessarily, the probes are mounted on a plate and each include a centrally disposed, metallic or otherwise rigid, apertured tube about which is placed an inflatable sleeve. In this form, the tubes are connected to a source of fluid pressure by which the sleeves may be inflated to expand the probes and evacuated to draw them inwardly against the tube for contraction.

A more complete understanding of the present invention and its method of use will be had by reference to the accompanying drawings in which:

FIG. 1 is a fragmentary side elevation illustrating the fruit harvester of this invention mounted at the end of a vehicular boom;

FIG. 2 is an enlarged front elevation of the fruit harvesting apparatus of this invention with the probes thereof expanded; and FIG. 3 is a cross-sectional view taken along line 3—3 of FIG. 2 and including a schematic showing of suitable means by which the probes may be expanded and contracted.

As shown in the drawing, the fruit harvester of this invention is generally designated by the reference numeral 10 and includes a plurality of spaced parallel probes 12 mounted on the front face 14 of a flat plate 16. A bracket 18 is suitably secured, such as by welding, to the rear face 20 of the plate, which bracket is adapted to be affixed to the upper end of an adjustable boom 22 carried by a vehicle 24. In the illustrated embodiment, each of the probes 12 is connected by way of pipes 26 mounted on the back of the plate 16 to a line 28 having a control valve 30 therein.

As shown in FIG. 2 of the drawings, the probes 12 are mounted on the plate 16 along inclined lines which intersect each other at acute angles so that the spaces defined by the probes are diamond shape, the major axis of each space being disposed horizontally. It will be understood that the spacing between the probes as they are mounted on the plates 16 may be selected to conform with the size of fruit to be picked, it being essential only that the probes are sufficiently spaced so that when contracted as shown in FIG. 1, the fruit will pass freely between the probes and sufficiently close so that the fruit may be gently but firmly engaged by expansion thereof to the extent shown in FIGS. 2 and 3 of the drawings. Also of course, the number and sizes of probes mounted on the plate 16 as well as the size of the plate, may vary with different types and sizes of fruit. Hence, if large fruit such as grapefruit is to be picked, the spacing between the probes is large whereas with small fruit, such as lemons, the spacing will be correspondingly smaller. Also, with smaller fruits, the number of probes mounted on the plate 16 may be increased.

As shown in FIG. 3, each of the probes 12 includes a centrally disposed, metallic or otherwise rigid tube 32 having apertures 34 therein. The tubes 32 may, if desired, form extensions of the pipes 26 extending through openings 36 in the plate 16 and are suitably secured thereto such as by welding 38. Positioned about each of the tubes 32 is an inflatable sleeve 40 having sealing lips 42 at each end thereof for effecting a hermetic seal about the tubes 32. The sleeves 40 may be formed from any suitable material such as rubber, plastic, textile material or any other material of this type which possesses suitable flexibility and which is impervious to pressure fluid.

As will be understood by those skilled in the art, any suitable means may be employed for inflating and evacuating the sleeves 40 and thereby effecting the expansion and contraction respectively of the probes 12. Preferably, however, this means should be capable of both forceably inflating and deflating the sleeves 40. Hence, by way of example, an air compressor 44 may be arranged to supply compressed air through an aspirating nozzle 46 into an exhaust tube 48 within which the control valve 30 is disposed. In this manner, when the valve 30 is closed the compressed air is applied directly to the interior of the sleeves 40 by way of line 28 pipes 26 and apertures 34 in the tubes 32. When the valve is opened, however, compressed air will be fed through the tube 48 to exhaust, thereby aspirating or drawing air forceably from the sleeves 40, urging them firmly into engagement with the tubes 32 to assure full contraction of the probes 12.

In operation, the fruit harvester 10 being mounted on the vehicular boom 22 as aforementioned is positioned adjacent a tree having fruit to be picked. The probes 12 are then contracted such as by opening the control valve 30 to evacuate the sleeves 40 and are inserted into the tree either by movement of the vehicle 24 or by manipulation of the boom 22 thereon. When the probes are properly positioned in the tree with the fruit in the spaces therebetween, the valve 30 is closed such that pressure fluid is fed through the apertures 34 in the tubes 32 to inflate the sleeves 40 and expand the probes firmly about the fruit. The probes are then withdrawn from the tree, again either by movement of the vehicle or manipulation of the boom 22 thereon, carrying the fruit with them. The vehicle is then manipulated to position the device 10 over suitable transporting means and the sleeves evacuated to contract the probes and release the fruit engaged thereby. In this manner, the fruit is gently picked from the tree and deposited in a truck or other transporting means in one handling operation, thereby effecting not only a considerable savings in time but also keeping at an absolute minimum the handling damage to the fruit.

It will be seen therefore, that by this invention there is provided a highly unique fruit harvesting device by which the aforementioned objectives are completely fulfilled. Moreover, it will be appreciated by those skilled in the art that the present invention may take a variety of specific forms. For example, while the inflatable probes 12 are preferred from the standpoint of simplicity of manufacture and of operation, other means could be employed for achieving the necessary expansion and contraction of the probes. Specifically, the probes could be in the form of an annulus of spongy foam material and arranged to be compressed and extended axially to achieve the necessary radial expansion and contraction respectively. Also, various mechanical mandrel constructions might be used within an annular cushion to achieve this function. Since many variations of the present invention are possible therefore, it is to be distinctly understood that the foregoing description is illustrative of a preferred embodiment only and that the true spirit and scope of this invention is to be determined by reference to the appending claims:

I claim:

1. A fruit picking apparatus comprising: a plurality of elongated rigid tubular elements each having an open end and an opposite closed end; mounting means connected to said elements near the open ends thereof for supporting said elements in fixed longitudinal relation to each other and to said mounting means and in fixed substantially parallel relation at the intersection of at least three mutually intersecting planes to define fruit receiving spaces therebetween predetermined in maximum dimensions, said spaces being unobstructed at the ends thereof adjacent the closed ends of said elements; elongated transversely expansible fingers mounted individually on said elements, each of said fingers having an annular transverse cross-section and being sealed in concentric relation about said elements to define an annular inflating chamber in each finger, said tubular elements being ported to the chambers of their respective fingers; and controlled pneumatic means connected to the open ends of said elements for corresponding inflation and deflection of the fingers, said fingers expanding into said spaces upon inflation to grasp fruit positioned therein after said mounting means has been moved to advance said elements and said fingers longitudinally into a fruit tree.

2. A fruit picking apparatus comprising in combination a vehicle adapted to be moved in position relative to a fruit tree; an article grasping device to engage and remove fruit from the tree; and means to support said article grasping device on said vehicle; said device comprising a plurality of elongated rigid elements each having an air passageway opening through one end thereof, mounting means connected to said elements near said one end thereof for supporting said elements in fixed longitudinal relation to each other and to said mounting means and in fixed substantially parallel relation at the intersections of at least three mutually intersecting planes to define fruit receiving spaces therebetween predetermined in maximum dimension, said spaces being unobstructed at the ends thereof opposite the ends of said elements connected to said mounting means, elongated transversely expansible fingers mounted individually on said elements, each of said fingers having an annular transverse cross-section and being sealed in concentric relation about said elements to define an annular inflating chamber in each finger, the passageways in said elements communicating with the chambers of their respective fingers, and controlled pneumatic means connected to the passageways in said elements for corresponding inflation and deflation of the fingers, said fingers expanding into the spaces upon inflation to grasp fruit positioned therein after said article grasping device has been moved to advance said elements and fingers longitudinally into a fruit tree.

References Cited

UNITED STATES PATENTS

| | | | |
|---|---|---|---|
| 2,611,612 | 9/1952 | Schmidt | 294—93 |
| 3,040,507 | 6/1962 | Lasswell | 56—328 |
| 2,784,997 | 3/1957 | Baumann | 294—88 |

RUSSELL R. KINSEY, *Primary Examiner.*